United States Patent
Devaraju et al.

(10) Patent No.: US 10,817,197 B2
(45) Date of Patent: Oct. 27, 2020

(54) DATA PARTITIONING IN A DISTRIBUTED STORAGE SYSTEM

(71) Applicant: Microsoft Technology Licensing, LLC, Redmond, WA (US)

(72) Inventors: Jegan Devaraju, Redmond, WA (US); Pradeep Seela, Redmond, WA (US); Yi-Fan Tsai, Bellevue, WA (US); Yongfu Lou, Redmond, WA (US); Kristopher T. Lange, Seattle, WA (US); Pei Zhang, Sammamish, WA (US); Maneesh Sah, Sammamish, WA (US); Shane K. Mainali, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/279,797

(22) Filed: Feb. 19, 2019

(65) Prior Publication Data
US 2019/0339886 A1 Nov. 7, 2019

Related U.S. Application Data

(60) Provisional application No. 62/667,145, filed on May 4, 2018.

(51) Int. Cl.
*G06F 3/06* (2006.01)

(52) U.S. Cl.
CPC .......... *G06F 3/0631* (2013.01); *G06F 3/0604* (2013.01); *G06F 3/067* (2013.01); *G06F 3/0644* (2013.01)

(58) Field of Classification Search
CPC .... G06F 3/0631; G06F 3/0604; G06F 3/0644; G06F 3/067; G06F 3/0689; G06F 3/064;
(Continued)

(56) References Cited

U.S. PATENT DOCUMENTS 5,551,027 A 8/1996 Choy et al.
7,299,239 B1 11/2007 Basu et al.
(Continued)

FOREIGN PATENT DOCUMENTS

EP 1400899 A2 3/2004
WO 2006094366 A1 9/2006

OTHER PUBLICATIONS

"Veeam Backup & Replication 9.5", Retrieved From: https://helpcenter.veeam.com/archive/backup/95/vsphere/sql_backup_job.html, Retrieved on: Jan. 10, 2019, 2 Pages.
(Continued)

*Primary Examiner* — David Yi
*Assistant Examiner* — Tahilba O Puche
(74) *Attorney, Agent, or Firm* — Mannava & Kang, P.C.

(57) ABSTRACT

A distributed storage system includes multiple partitions. A block received for storage is striped across the partitions if it meets predetermined criteria. Multiple tables are maintained for indexing the blocks and the subblocks of blocks that are partitioned. The tables for the subblocks and the tables for the corresponding blocks of the subblocks are updated to include metadata for the subblocks for retrieving the subblocks in response to a request for a corresponding stored block.

18 Claims, 5 Drawing Sheets

(58) Field of Classification Search
CPC .. G06F 3/061; G06F 3/0611; G06F 2212/262; G06F 12/1009; H04L 67/1097
See application file for complete search history.

(56) References Cited

U.S. PATENT DOCUMENTS

| | | | |
|---|---|---|---|
| 7,685,109 | B1 | 3/2010 | Ransil et al. |
| 7,743,210 | B1* | 6/2010 | Jernigan, IV ......... G06F 3/0619 711/114 |
| 8,069,141 | B2 | 11/2011 | Wetmore et al. |
| 8,121,978 | B2 | 2/2012 | Wiss et al. |
| 8,135,930 | B1 | 3/2012 | Mattox et al. |
| 8,495,036 | B2 | 7/2013 | Calder et al. |
| 8,620,884 | B2 | 12/2013 | Calder et al. |
| 9,501,364 | B1 | 11/2016 | Bushman et al. |
| 9,736,243 | B2 | 8/2017 | Chablani et al. |
| 9,798,620 | B2* | 10/2017 | Wood ................. G06F 11/108 |
| 2006/0112222 | A1* | 5/2006 | Barrall ............... G06F 11/1662 711/114 |
| 2010/0106695 | A1* | 4/2010 | Calder ............... G06F 16/2255 707/696 |
| 2011/0066592 | A1 | 3/2011 | Newport et al. |
| 2012/0084260 | A1 | 4/2012 | Cherkauer et al. |
| 2013/0268488 | A1 | 10/2013 | Jackiewicz et al. |
| 2015/0301934 | A1* | 10/2015 | Baderdinni ........... G06F 3/0631 711/103 |
| 2016/0041906 | A1* | 2/2016 | Mukherjee ......... G06F 16/2379 711/119 |
| 2016/0140202 | A1 | 5/2016 | Calder et al. |
| 2016/0147859 | A1 | 5/2016 | Lee et al. |
| 2017/0024142 | A1* | 1/2017 | Watanabe ................. G06F 3/06 |
| 2017/0161350 | A1 | 6/2017 | Calder et al. |
| 2018/0046551 | A1 | 2/2018 | Bourbonnais et al. |
| 2019/0340185 | A1 | 11/2019 | Seela et al. |

OTHER PUBLICATIONS

Calder, et al., "Windows Azure Storage: A Highly Available Cloud Storage Service with Strong Consistency", In Proceedings of the Twenty-Third ACM Symposium on Operating Systems Principles, Oct. 23, 2011, 26 Pages.

Chen, et al., "Non Provisional Application Filed in U.S. Appl. No. 15/957,386", filed Apr. 19, 2018, 54 Pages.

Pavliashvili, Baya, "Log Shipping a Replicated Database", Retrieved From: https://searchsqlserver.techtarget.com/tip/Log-shipping-a-replicated-database, Aug., 2005, 4 Pages.

Roth, et al., "About Log Shipping (SQL Server)", Retrieved From: https://docs.microsoft.com/en-us/sql/database-engine/log-shipping/about-log-shipping-sql-server?view=sql-server-2017#ComponentsAndConcepts, May 17, 2016, 6 Pages.

"Database VLDB and Partitioning Guide", Retrieved from:<<https://web.archive.org/web/20161108115612/https:/docs.oracle.com/cd/E11882_01/server.112/e25523/part_admin001.htm>>, Nov. 8, 2016, 16 Pages.

"How Data Partitioning in Spark helps Achieve more Parallelism?", Retrieved from:<<https://www.dezyre.com/article/how-data-partitioning-in-spark-helps-achieve-more-parallelism/297>>, Aug. 26, 2016, 6 Pages.

Curino, et al., "Schism: a Workload-Driven Approach to Database Replication and Partitioning", In Proceedings of the VLDB Endowment, vol. 3, Issue 1-2, Sep. 1, 2010, pp. 48-57.

Lejeune Jr., David W., "Adaptive Partitioning and its Applicability to a Highly Scalable and Available Geo-Spatial Indexing Solution", In Journal of Computing Research Repository, Mar. 2013, 7 Pages.

Ross, et al., "Optimal Splitters for Database Partitioning with Size Bounds", In Proceedings of the 12th International Conference on Database Theory, Mar. 23, 2009, 13 Pages.

"International Search Report and Written Opinion Issued in PCT Application No. PCT/US2019/026989", dated Jul. 10, 2019, 17 Pages.

"International Search Report and Written Opinion Issued in PCT Application No. PCT/US2019/029510", dated Jul. 23, 2019, 13 Pages.

Sobe, Peter, "Adaptations of Block Layout in Distributed Storage Systems", In Proceedings 14th Euromicro International Conference on Parallel, Distributed, and Network-Based Processing, Feb. 15, 2006, 10 Pages.

* cited by examiner

DATA PARTITIONING IN A DISTRIBUTED STORAGE SYSTEM

PRIORITY

The present application claims priority to U.S. Provisional Patent Application Ser. No. 62/667,145, filed May 4, 2018, which is incorporated by reference in its entirety.

BACKGROUND

A distributed storage system can support several different types of applications, from social networking to managing medical records. The distributed storage system can be implemented with user files, structured storage, and message delivery in order to support storage and workflow of the applications. Specifically, a distributed storage system can be configured to receive requests to perform transactions that facilitate the storage and workflow of the applications.

The capacity of the distributed storage system to handle high volumes of transactions can be critical to the overall performance of the distributed storage system and the applications that utilize the distributed storage system. For example, the distributed storage system may be used in a cloud environment, and a cloud application may utilize the distributed storage system to store and retrieve data for real-time or near-real-time transactions. Any delay in accessing the data from the distributed storage system by the cloud application could cause the cloud application to fail or may cause a degraded experience for an end user using the cloud application.

BRIEF DESCRIPTION OF DRAWINGS

Embodiments and examples are described in detail in the following description with reference to the following figures. The embodiments are illustrated by examples shown in the accompanying figures in which like reference numerals indicate similar elements.

DETAILED DESCRIPTION

Figure 1:
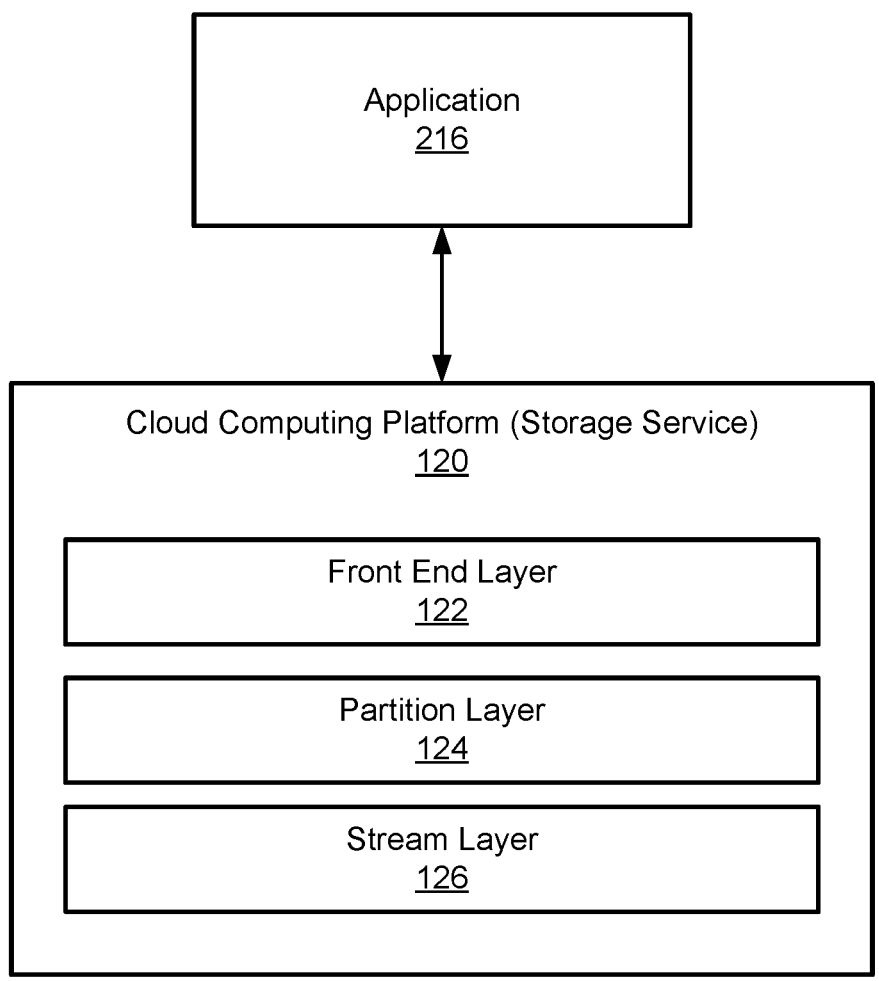
FIG. 1 shows an architecture of a distributed storage system, according to an embodiment.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

According to an example of the present disclosure, a distributed storage system, which is further discussed below with respect to the system 100, may store data in a plurality of nodes. The system may include a primary data structure, which may be referred to as an objects table, that stores data, such as pointers to data objects stored in the system, and metadata for the data, together. The system may also include a secondary data structure, which may be referred to as a blocks table, that stores data and meta data for certain data objects that may be striped across partitions in the system. Certain criteria may be used to determine whether to stripe certain data objects across partitions in the system. In an example, a size threshold of a data object may be used to select data objects for striping. In an example, data objects, having a size greater than a threshold, e.g., a 1 megabyte (MB) threshold, or a 4 MB threshold, or another size threshold, are striped across multiple partitions to improve throughput for accessing those data objects, and the blocks table is used to store information for those data objects. In other examples, multiple heuristics or criteria are used to select data objects for striping. For example, size, location, type of data storage (e.g., flash versus disk), etc., may be used to determine whether to stripe a data object and store it in the blocks table.

In certain situations, the objects table can grow to terabytes and can become a bottleneck for accessing data objects in the system. By utilizing a hybrid approach, which stores certain data objects meeting particular criteria in the blocks table and which stores remaining data objects in the objects table, the throughput for the system is greatly increased. For example, the hybrid approach may improve the maximum write throughput of a single data object from 100 megabits per second (Mbps) to 50 gigabits per second (Gbps). If the hybrid approach were not used, and all the data of the distributed storage system is stored in the objects table, a significant amount of time, e.g., twenty minutes or more, may be needed for load balancing the objects table across nodes to optimize write throughput. By using the hybrid approach, a storage account in the system can maximize write throughput instantaneously, avoiding the time delay required for load balancing. The hybrid approach, thus, can achieve maximum write throughput instantaneously for large data objects; keep write latency low for small data objects by continuing to store them in the objects table; and can achieve scalability and high throughput while being strongly consistent and range partitioning an index for the stored data objects. Generally, the hybrid approach provides higher throughput through better scale-out; provides instant throughput as there is no need to split range partitions for a busy key range; and, as is further described below, provides an object naming scheme that does not affect throughput and that invokes even distribution of load across partitions.

For purposes of a detailed discussion below, embodiments and examples of the distributed storage system are described with reference to a storage service supported by a cloud computing platform, and further by way of example, a cloud computing platform having a front-end layer, partition layer, and stream layer. However, the embodiments and examples described herein can be performed in different types of operating environments having alternate configurations of the functional components described herein. As such, the embodiments and examples may be extended to other implementation contexts.

The distributed storage system can be implemented as a cloud computing platform that runs cloud services across different data centers and geographic regions. The cloud computing platform can implement a fabric controller component for provisioning and managing resource allocation, deployment/upgrade, and management of cloud services. Typically, a cloud computing system acts to store data or run service applications in a distributed manner. The service-application components (e.g., tenant infrastructure or tenancy) of the cloud computing system may include nodes (e.g., computing devices, processing units, or blades in a server rack) that are allocated to run one or more portions of a tenant's service applications.

Nodes of the distributed storage system may include virtual machines or physical machines. The nodes can concurrently run separate service applications, respectively, in individualized computing environments that support the resources and/or operating system specific to each service application. Further, each service application may be divided into functional portions such that each functional portion is able to run on a separate virtual machine. In cloud computing systems, multiple servers may be used to run service applications and perform data storage operations in a cluster. In particular, the servers may perform data operations independently but exposed as a single device referred to as a cluster. Each server in the cluster may be referred to as a node.

The system may include a storage service on the cloud computing platform that is supported using the fabric controller component. The storage service can be responsible for managing the replication and data placement across disks and load balancing the data and the application traffic with storage clusters. The storage service can be responsible for managing access to a high volume of storage. The storage service can implement a storage stamp as a cluster of N (where N is an integer greater than or equal to 1) racks of storage nodes and a location service that manages the storage stamps. Specifically, the location service can allocate location stamps and manage them across the storage stamps for disaster recovery and load balancing.

FIG. 1 shows an architecture for a distributed storage system 100 on a cloud computing platform 120, according to an embodiment of the present disclosure. The system 100 includes a storage service including a front-end (FE) layer 122, a partition layer 124, and a stream layer 126 (or distributed file system layer). The FE layer 122 may be configured for receiving incoming requests from an application 216 or client. Upon receiving a request, the FE layer 122 can authenticate and authorize the request. The FE layer 122 can route the request to a partition server in the partition layer. A partition server is also referred to as a table server or TS. A partition map is maintained that keeps track of partitions and which partition server is serving which partition. The FE layer 122 may access the partition map to determine the partition server serving a partition to be accessed.

The partition layer 124 is responsible for managing and understanding high level abstractions of user files, structured storages, and messaging. The partition layer 124 also provides a scalable index, transaction ordering, and storing consistency for objects. The partition layer 124 can specifically support storing object data on top of the stream layer 126. In an example, the partition layer partitions data objects within a storage stamp.

The partition layer 124 includes the primary data structure, referred to as the objects table (OT). The OT indexes blocks stored in the distributed storage system. The OT can grow to be a massive table, such as several petabytes. The OT is dynamically broken up into range partitions, referred to herein as partitions, and spread across partition servers of a storage stamp. A partition may include a contiguous range of rows in the OT from a given low-key to a high-key. For example, the storage space in the storage stamp is represented as a key space divided amongst a plurality of partitions. In an example, each row in the OT has a primary key determined from properties of the data object in the row, and the keys may be used for indexing and sorting the rows in the OT and for performing look-ups. Each key may be defined by one or more properties of the data objects stored in the system 100. For example, the primary key may include one or more properties of a data object, such as Account Name, Partition Name and Object Name. In an example, properties of data objects may be selected to generate keys for each row in the OT table. For example, properties may be selected to generate a partition key and a row key for each row. An account name, a table name and partition key together may identify the partition within the storage service where the data object is stored. The row key may uniquely identify each row in a partition in the OT. As with keys in a relational database table, partition key and row key values are indexed to create a clustered index that enables fast look-ups. The OT may be distributed across partition servers serving requests for the partitions.

Also, the partition layer 124 includes the blocks table. The blocks table may also be partitioned and distributed across partition servers. The blocks table indexes subblocks stored in the partition servers. The blocks table may include one or more keys defined by one or more properties of the data objects stored in the blocks table. When a binary large object (blob) or another type of data object is striped across partitions, a blocklink (e.g., a pointer) may be created for each subblock, and stored in the blocks table along with other metadata. Instead of creating a blocklink for each subblock, in another example, a blocklink may be created for all the subblocks within a block. The blocklink is also stored in the OT for the blob, and may be used to retrieve the subblock for the blob. The blocks table and the OT are further discussed below.

In an embodiment, the blob data is stored in the same logs and checkpoints as typical row data, but in different structures. In an additional exemplary embodiment, the blob data is stored in separate logs and checkpoints from the row data. This allows for compaction/merging of the row checkpoints without having to recopy blob data, and it allows for a single-write blob insert/update. As previously mentioned, the blob data is typically large, therefore, abstaining from the recopying of blob data provides efficiencies. By storing the blob data in different logs and checkpoints, the expense of recopying the data can be minimized because blob data can be large (relative to traditional row data). Additionally, the separate logs and checkpoints can be stored in the same file or stream, or in the alternative, the blob data can be stored in a separate stream from the row data.

The stream layer 126 stores bits on disk or other types of storage devices and supports replicating the data across many servers to keep data durable within a storage stamp. The stream layer 126 supports files called streams which are ordered lists of large storage chunks called extents. The stream layer stores and replicates extents. The data stored in the stream layer is accessible from the partition layer 124. The stream layer 126 may provide a file system namespace and an Application Programming Interface (API) for the partition layer 124 to perform writes and reads. Writes can be append-only. The interface between the stream layer 126 and partition layer 124 allows a client to open, close, delete, rename, append to, and concatenate streams. A stream can refer to an ordered list of extent points and an extent is a sequence of append blocks. An extent can be a seal extent, such that, the extent can no longer be appended to. An application can read data from extents to access block contents of the extents.

The stream layer 126 can include a stream manager and an extent node. The stream manager is responsible for tracking the stream namespace, what extents are in each stream and the extent allocation across extent nodes. The stream manager performs lazy re-replication of extent replicas that are lost due to hardware failures or unavailability. Each extent node maintains the storage for a set of replicas assigned to the corresponding extent by the stream manager. Each extent node contains a view about the extents it owns and where the peer replicas are for a given extent.

The distributed storage system 100 can support several different types of applications, from social networking to managing medical records. The distributed storage system 100 can specifically be implemented with user files, structured storage, and message delivery in order to support storage and workflow of the applications. The distributed storage system 100 can be configured to receive transactions that facilitate the storage and workflow of the applications.

Figure 2:
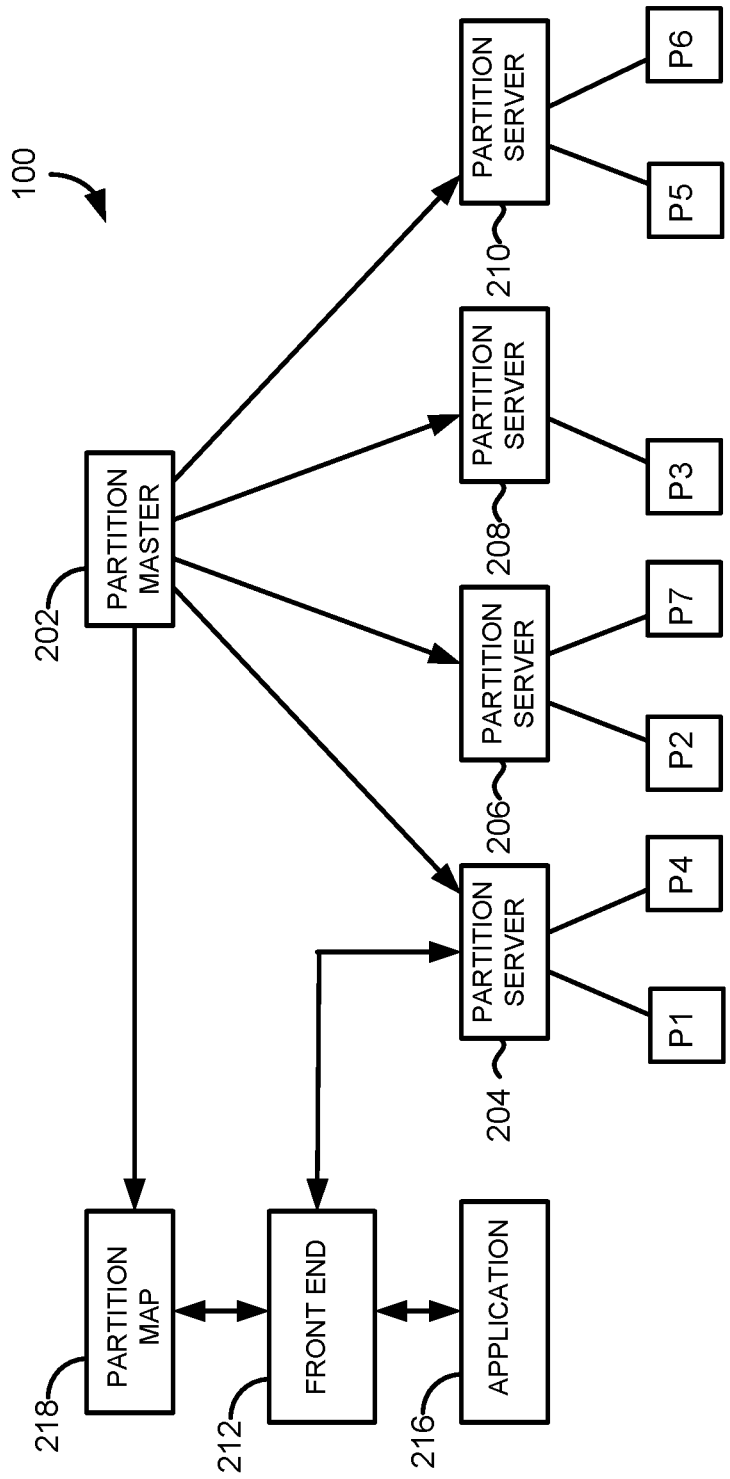
FIG. 2 shows components of a front-end layer and a partition layer of the distributed storage system, according to an embodiment.

FIG. 2 illustrates an example of components of the distributed storage system 100, including components of the FE layer 122 and the partition layer 124. Many of the components described herein are functional entities that may be implemented as discrete or distributed components or in conjunction with other components, and in any suitable combination and location. Various functions described herein as being performed by one or more entities may be carried out by hardware, firmware, and/or software. For instance, functions and operations performed by the layers and components described herein may be carried out by a processor executing instructions stored in memory.

The components of the partition layer 124 may include master 202 (e.g. partition master 202), servers 204, 206, 208, and 210 (e.g. partition servers 204, 206, 208, and 210), and FE 212 (e.g. partition FE 212). Each may reside on any type of computing device. The components may communicate with each other over a network, which may include, without limitation, one or more local area networks (LANs) and/or wide area networks (WANs). Although a single master, four servers, and a single FE are shown in FIG. 2, any number of masters, servers, and FEs may be employed within the distributed storage system 100 within the scope of implementations of the present disclosure.

Stored data of the distributed storage system 100 is divided amongst a plurality of partitions. For example, a key space representing stored data objects is divided amongst the plurality of partitions. The partitions may include range partitions in the OT, as is mentioned above and as is further discussed below. Master 202 is configured to assign the partitions to partition servers 204, 206, 208, and 210, and/or other servers of a cloud computing system. Master 202 can also be configured to determine when a partition of the partitions is not hosted by any server due to a failure and reassign the partition to a different server. Master 202 is further configured to control load balancing of the partitions on servers 204, 206, 208, 210, and/or other servers of the distributed storage system 100 not shown. Additionally, master 202 is configured to monitor resource utilization with respect to any of the partitions and/or servers 204, 206, 208, and 210, and/or other servers of the distributed storage system 100 not shown. It is further contemplated that master 202 is configured to support integrated resource allocation and load balancing in accordance with embodiments of the present invention, as discussed in more detail below.

The servers, such as partition servers 204, 206, 208, and 210, are utilized to store and provide access to the data objects of the distributed storage system 100. Master 202 is configured to manage the servers. Furthermore, front end (FE) 212 is configured to provide applications, such as application 216, access to the distributed storage system 100. Each server, such as partition servers 204, 206, 208, and 210, can be responsible for providing read and write access from zero to many partitions assigned to the server. In the example shown in FIG. 2, server 204 is hosting partitions P1 and P4, server 206 is hosting partitions P2 and P7, server 208 is hosting partition P3, and server 210 is hosting partitions P5 and P6.

FE 212, which may be part of the front-end layer 122 shown in FIG. 1, is linked into an application, such as application 216. FE 212 may be configured to issue commands to some of the partitions (e.g. partitions P1, P2, P3, P4, P5, P6, and P7) hosted by partition servers 204, 206, 208, and 210 and/or other servers. Also, in some implementations, FE 212 may communicate with the application indirectly, for example, through a virtual IP and software load balancer or other means that directs communication requests. The FE 212 can utilize a partition map, such as partition map 218, to determine which of the servers is hosting (mapped to) which of the partitions and can send commands to those servers. Results of the commands can be received back from the servers and can be passed to the application 216. The partition map 218 stores mappings between the partitions and the servers they are assigned to, and can typically be maintained by a master, such as partition master 202.

Data objects stored in the distributed storage system 100 may include binary large objects referred to as blobs. The distributed storage system 100 is functional to provide scalable, available, and durable blob storage in a structured storage environment. A blob is a collection of binary data stored as a single entity. As a matter of example, blobs may be images, audio, records, text, or other multimedia objects. Blobs can also be executable code or other collections of binary data.

In an example, the OT is in the partition layer 124 shown in FIG. 1, and can store data and metadata for blobs. For example, the OT includes row data for each of the blobs. The row data includes metadata corresponding to each blob, and the row data includes a pointer to a storage location for the blob. In an example, a schema for the OT may include account name, container name, blob name, and other meta data describing blobs. The schema may also include one or more pointers to the blob that describe the location of the blob in the stream layer, such as a stream position. The OT may also include a blocklink for its subblocks if they are striped across partitions.

In an example, the blocks table is in the partition layer 124, and can store data and metadata for subblocks of a blob that are striped across a plurality of partitions. For example, the blocks table includes row data for each subblock. The row data includes metadata corresponding to each subblock, and the row data includes a pointer to a storage location for the subblock. In an example, a schema for the blocks table may include a blocklink, account name, container name, blob name, block ID and other meta data describing the subblock. The schema may also include a pointer to the subblock. In an example, the blocklink includes a globally unique ID (GUID) for the subblock, and the blocklink is also stored in the OT for the corresponding blob and is used as a table key linking the row for the subblock in the blocks table to the row for the blob in the OT.

Figure 3:
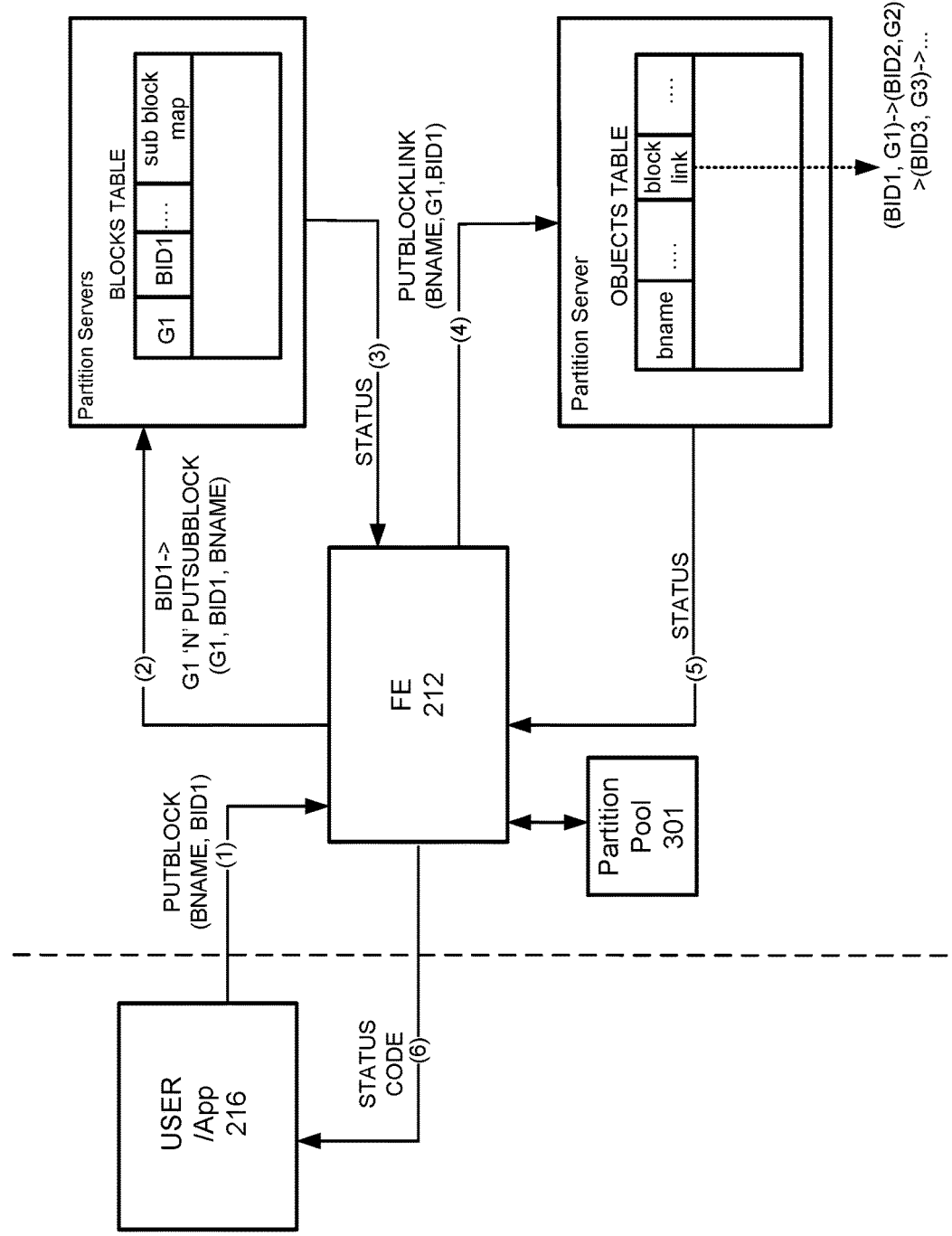
FIG. 3 shows a data flow diagram for a write request, according to an embodiment.

According to an example of the present disclosure, a block may be striped across multiple partitions instead of being stored on a single partition. FIG. 3 shows an example of a data flow for a write request that may be striped across multiple partition servers. In this example, the write request is a put block request. Although the data flow is shown for a write request, the system 100 is operable to perform read (e.g., get request) and write requests for a block which may or may not be striped across multiple partition servers.

Referring to FIG. 3, at 1, a FE of the distributed storage system 100, such as FE 212 shown in FIG. 2, receives a put block request from a user. The put block request may alternatively come from an application, such as application 216 shown in FIGS. 1 and 2. The put block request may include a blob name, shown as BNAME, assuming the block is part of a blob, and a block identifier (ID), shown as BID1, of the block to be put in the distributed storage system 100. A block is a data object. In an example, the block is for a collection of data objects that may be stored or managed as a single entity. The block may be one of a plurality of blocks of a blob.

The FE 212 determines whether to stripe the incoming put block request across multiple partitions instead of storing in a single partition. For example, a pool of dedicated partitions for striping, shown as partition pool 301, may be maintained. In an example, the partition pool 301 may not be directly connected to the FE 212. For example, the partition pool 301 is maintained by the partition layer 124 shown in FIG. 1, and the FE 212, which may be part of the front-end layer 122, communicates with the partition layer 124 to store or retrieve data to or from a partition from the partition pool 301.

Referring back to FIG. 3, the FE 212 determines whether the block for the put block request meets predetermined criteria for striping. For example, assume that the FE 212 determines the block size of the block in the put block request meets predetermined criteria, such as being greater than a predetermined size, and then in response to the determination, the FE 212 decides to stripe the block across a plurality of partitions from the partition pool 301. The FE 212 divides the block into subblocks. A default size may be used for the subblocks. The subblocks determined by the FE 212 are immutable. The FE 212 generates a blocklink for each of the subblocks. The blocklink includes a GUID for each of the subblocks. The GUID for each subblock uniquely identifies the subblock across the partitions that may store the subblocks for the striped block. For example, each GUID uniquely identifies a subblock in the partition pool 301. The GUID may include a prefix that is random and is used to select a partition from the partition pool 301 to store each subblock. For example, a goal of the FE 212 may be to evenly distribute the load of the partition pool 301. Each of the partitions in the partition pool 301 may be pre-assigned a prefix value in a range. To store each subblock, a prefix value in the range may be randomly generated to select a partition from the partition pool 301 to store the subblock to evenly distribute the load among the partitions in the partition pool 301.

At 2, the FE 212 sends putblock requests for the subblocks to the partition servers serving the applicable partitions from the partition pool 301 after determining to stripe the block. For example, the FE 212 sends a sequence of put subblock requests to the partition servers serving requests for partitions that are selected from the partition pool 301 according to the GUID prefixes selected for the subblocks. The request for each subblock may identify the GUID generated for the subblock, the block ID, the block name, and may specify other information. For each subblock request, a row in the blocks table may store the information for the request. For example, a portion of the first row of the blocks table is shown, and may include G1, which is the GUID for the first subblock, BID1, which is the block ID for the block containing the subblock, and a subblock map which specifies the partition server to host the subblock. A row may be created in the blocks table for each subblock. At 3, the FE 212 receives a status of each of the put subblock requests from the corresponding partition servers, which indicates the information has been written to the corresponding partition servers associated with the partitions from the partition pool 301 that were selected to store the subblocks.

At 4, the FE 212 sends a putblocklink request to the applicable partition server after getting confirmation the subblocks have been written. For example, the putblocklink request is sent to the partition server serving the partition associated with the blob, which was initially identified by its blob name in the putblock request at 1. For example, the FE 212 sends a putblocklink command to the applicable partition server storing the OT associated with the block ID. The putblocklink command may include the block name, blocklink, blockID and other applicable inputs, and this information is stored in a row of the objects table of the partition server. Accordingly, the blocklink, e.g., G1, stored in the OT is a key to the blocks table to identify the location of the subblocks.

At 5, the FE 212 receives from the partition server serving the OT, an indication that the row has been written for the subblocks to the OT. A row may be written to the OT in the partition server for each blocklink. At 6, a status is sent to the user/application 216 that the put block request is completed.

Figure 4:
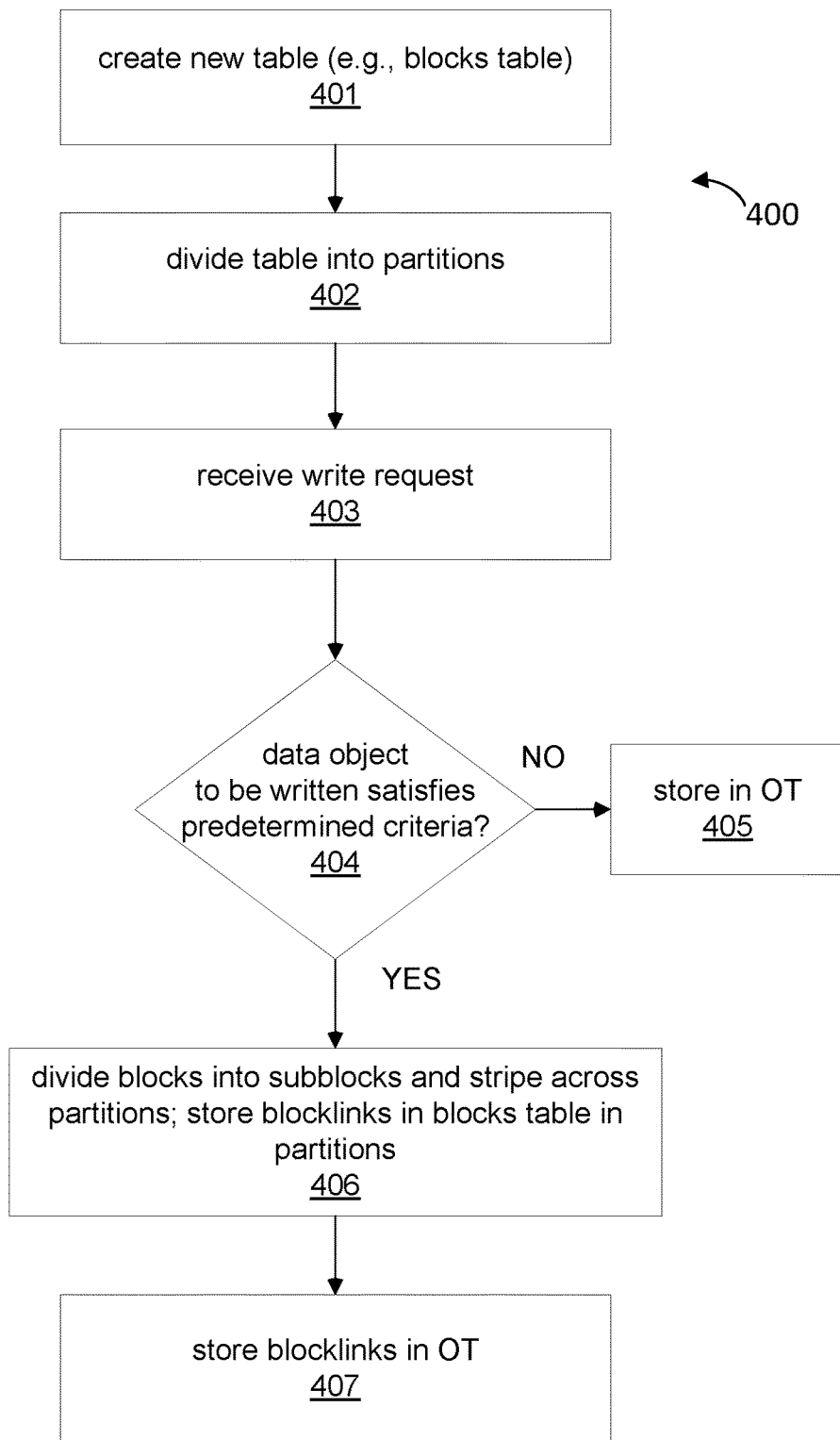
FIG. 4 shows a flow chart that may be performed by the distributed storage system, according to an embodiment.

FIG. 4 illustrates a flow chart 400, according to an embodiment. At 401, a new table is created, such as the blocks table, to serve as an index hosting different subblocks of a blob (or other data object) across multiple partitions. The OT may already exist. The blocks table can host subblocks of blobs from multiple accounts of a tenant of the cloud distributed storage system. At 402, the blocks table is divided into "X" partitions. In examples, "X" is a percentage of a total partition count. A pool of the partitions may be created and the partitions are served by a plurality of partition servers.

At 403, a write request is received, e.g., put block request. The write request may be for a blob. At 404, a determination is made as to whether a data object to be written satisfies predetermined criteria. For example, a determination is made as to whether the block to be written has a size greater than a predetermined threshold. Other criteria may be used for the determination and may be dynamic. If no (e.g., size is less than or equal to threshold), then the block is not striped, and the block's metadata is stored in the OT at 405. For example, the block and its metadata are written to a partition serving the OT. At 406, if yes (e.g., size is greater than the threshold), the block is divided into subblocks, and the subblocks are striped across partitions and written to the blocks tables associated with the partitions. The subblocks, their blocklinks including GUIDs, and other metadata are stored in the blocks tables of the partitions. At 407, the blocklinks are stored in the OT associated with the original block, such as a blob, which is divided into the subblocks. Then, if a read request for the block is received, the FE 212 may retrieve the subblocks from the blocks tables based on the blocklinks in the OT. In an example, to retrieve a striped block, a block identifier of the block is determined. Then, an entry in the OT associated with the block identifier of the block is identified. The pointer, including GUIDs, which identifies entries in the blocks table for the subblocks of the block is determined from the entry. A lookup is executed in the blocks table according to the pointer to identify the partitions storing the subblocks for retrieving the subblocks.

The block tables may be transparent to the user or application 216 making the request that is received at 403. By dividing the block into subblocks and storing them in different partition servers, the subblocks may be written or read in parallel, and may improve throughput of the requests. Also, bottlenecks caused by only using the OT to read and write blocks, such as blobs, are avoided.

Figure 5:
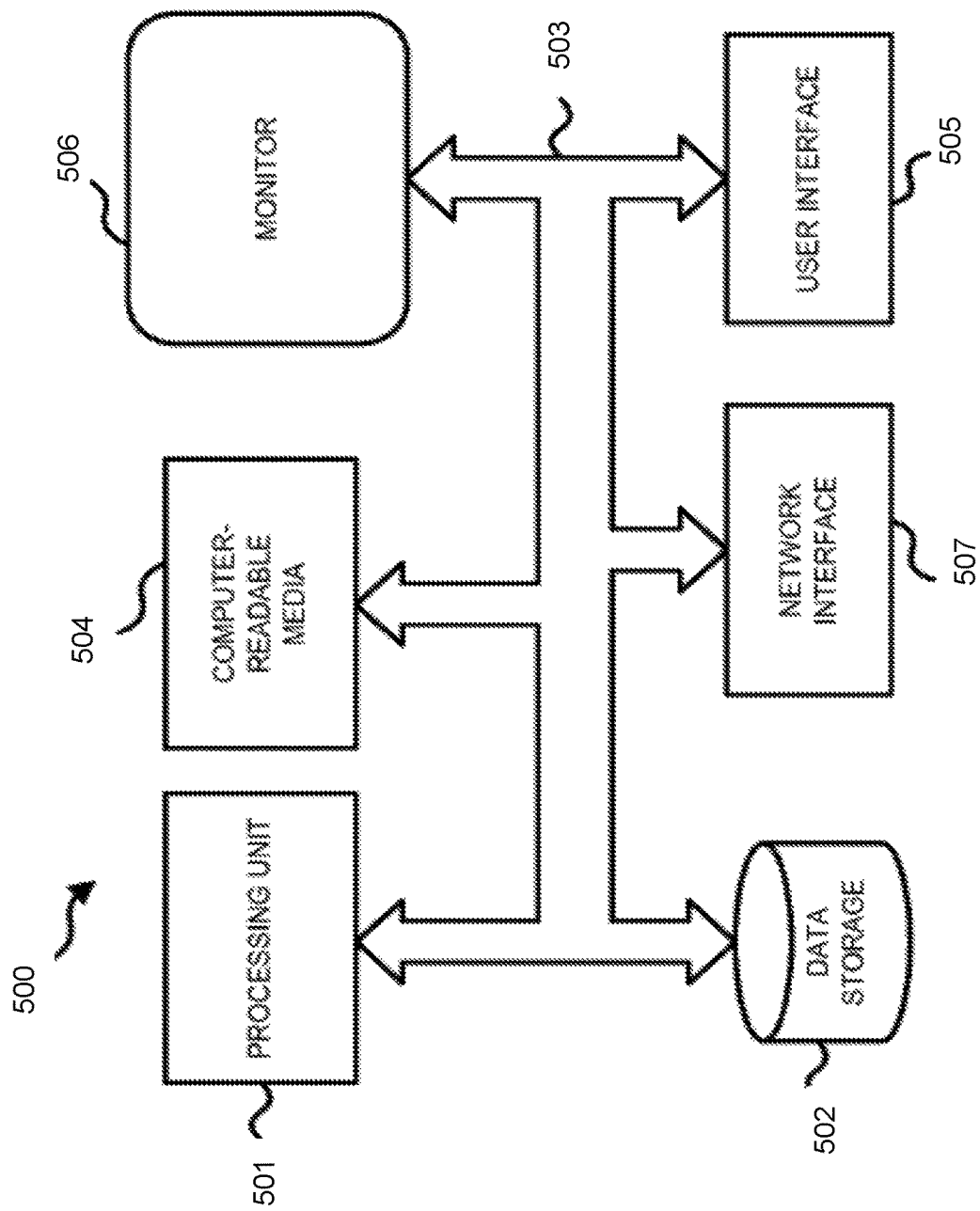
FIG. 5 shows an example of a computing environment, according to an embodiment.

FIG. 5 shows an example of a suitable computing and networking environment on which the examples and embodiments described above may be implemented. The computing system environment is only one example of a suitable computing environment and is not intended to suggest any limitation as to the scope of use or functionality of the examples and embodiments described above. The examples and embodiments described above is operational with numerous other general purpose or special purpose computing system environments or configurations. Examples of well-known computing systems, environments, and/or configurations that may be suitable for use with the examples and embodiments described above include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The examples and embodiments described above may be described in the general context of computer-executable instructions, such as program modules, being executed by a computer. Generally, program modules include routines, programs, objects, components, data structures, and so forth, which perform particular tasks or implement particular abstract data types. The examples and embodiments described above may also be practiced in distributed computing environments where tasks are performed by remote processing devices that are linked through a communications network. In a distributed computing environment, program modules may be located in local and/or remote computer storage media including memory storage devices.

FIG. 5 shows an example of a system for implementing various aspects of the example and embodiments described herein and may include a computing device in the form of a computer 500. Components may include, but are not limited to, various hardware components, such as processing unit 501, data storage 502, such as a system memory, and system bus 503 that couples various system components including the data storage 502 to the processing unit 501. The system bus 503 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 500 typically includes a variety of non-transitory computer-readable media 504. Computer-readable media 504 may be any available media that can be accessed by the computer 500 and includes both volatile and non-volatile media, and removable and non-removable media, but excludes propagated signals. By way of example, and not limitation, computer-readable media 504 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 500. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 502 includes computer storage media in the form of volatile and/or nonvolatile memory such as read only memory (ROM) and random access memory (RAM). A basic input/output system (BIOS), containing the basic routines that help to transfer information between elements within computer 500, such as during start-up, is typically stored in ROM. RAM typically contains data and/or program modules that are immediately accessible to and/or presently being operated on by processing unit 501. By way of example, and not limitation, data storage 502 holds an operating system, application programs, and other program modules and program data.

Data storage 502 may also include other removable/non-removable, volatile/nonvolatile computer storage media. By way of example only, data storage 502 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 5, provide storage of computer-readable instructions, data structures, program modules and other data for the computer 500.

A user may enter commands and information through a user interface 505 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 501 through a user input interface 505 that is coupled to the system bus 503, but may be connected by other interface and bus structures, such as a parallel port, game port or a universal serial bus (USB). A monitor 506 or other type of display device is also connected to the system bus 503 via an interface, such as a video interface. The monitor 506 may also be integrated with a touch-screen panel or the like. Note that the monitor and/or touch screen panel can be physically coupled to a housing in which the computing device 500 is incorporated, such as in a tablet-type personal computer. In addition, computers such as the computing device 500 may also include other peripheral output devices such as speakers and printer, which may be connected through an output peripheral interface or the like.

The computer 500 may operate in a networked or cloud-computing environment using logical connections to one or more remote devices, such as a remote computer. The remote computer may be a personal computer, a server, a router, a network PC, a peer device or other common network node, and typically includes many or all of the elements described above relative to the computer 500. The logical connections depicted in FIG. 5 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 500 may be connected to a public or private network through a network interface or adapter 507. In some embodiments, a modem or other means for establishing communications over the network. The modem, which may be internal or external, may be connected to the system bus 503 via the network interface 507 or other appropriate mechanism. A wireless networking component such as comprising an interface and antenna may be coupled through a suitable device such as an access point or peer computer to a network. In a networked environment, program modules depicted relative to the computer 500, or portions thereof, may be stored in the remote memory storage device. It may be appreciated that the network connections shown are exemplary and other means of establishing a communications link between the computers may be used.

The computer 500 may be a server or another type of computer. The computer 500 may include a platform for hosting one or more components of the partition layer or the FE layer.

Embodiments and examples are described above, and those skilled in the art will be able to make various modifications to the described embodiments and examples without departing from the scope of the embodiments and examples.

What is claimed is:

1. A computing device in a distributed storage system, the computing device comprising:
   at least one memory containing machine-readable instructions; and
   at least one processor to execute the machine-readable instructions to:
      receive a write request for a block;
      determine whether the block satisfies predetermined criteria;
      in response to determining the block satisfies the predetermined criteria,
         striping the block across a plurality of partitions in a pool of partitions,
         wherein striping the block across the plurality of partitions comprises:
            storing subblocks and metadata for the subblocks in a blocks table associated with the plurality of partitions; and
            storing, in an objects table associated with the block, a pointer to entries in the blocks table for the subblocks; and
      in response to the block not satisfying predetermined criteria, not striping the block and storing the block and its metadata in the objects table without storing the block in the blocks table.

2. The computing device of claim 1, wherein to determine whether the block satisfies predetermined criteria, the at least one processor determines whether a size of the block is greater than or equal to a predetermined size.

3. The computing device of claim 1, wherein storing metadata for the subblocks comprises:
   storing a globally unique identifier for each subblock in the blocks table, wherein the globally unique identifier for each subblock uniquely identifies the subblock across the plurality of partitions; or
   storing a globally unique identifier for all subblocks of a block in the blocks table, wherein the globally unique identifier uniquely identifies the subblocks across the plurality of partitions.

4. The computing device of claim 3, wherein an entry is created in the blocks table for the metadata, including the globally unique identifier, for each subblock, and the pointer in the objects table identifies the entries for the subblocks in the blocks table.

5. The computing device of claim 3, wherein, for each subblock, a portion of the globally unique identifier identifies the partition that stores the subblock.

6. The computing device of claim 5, wherein the portion of the globally unique identifier that identifies the partition storing the subblock is randomly selected for distributing load across the plurality of partitions.

7. The computing device of claim 1, wherein the objects table is partitioned.

8. The computing device of claim 1, wherein the blocks table is partitioned.

9. The computing device of claim 1, wherein to retrieve the block after it is striped, the at least one processor is to:
   determine a block identifier of the block;
   identify an entry in the objects table associated with the block identifier of the block;
   determine from the entry, the pointer which identifies entries in the blocks table for the subblocks of the block;
   execute a lookup in the blocks table according to the pointer to identify the partitions storing the subblocks for retrieving the subblocks.

10. A system comprising:
    computer storage media storing:
       an objects table indexing blocks stored in a distributed storage system; and
       a blocks table indexing subblocks of at least one of the blocks stored in the distributed storage system; and
    at least one processor to:
       determine whether to stripe a block to be stored in the distributed storage system across a plurality of partitions of the distributed storage system or store the block in a single partition of the distributed storage system;

in response to determining to stripe the block across the plurality of partitions,
storing subblocks of the block and metadata for the subblocks in the blocks table, and
storing, in the objects table, a pointer to entries in the blocks table for the subblocks; and
in response to determining not to stripe the block across the plurality of partitions, the at least one processor is to store the block and its metadata in the objects table without storing information associated with the block in the blocks table.

11. The system of claim 10, wherein storing metadata for the subblocks comprises:
storing a globally unique identifier for each subblock in the objects table, wherein the globally unique identifier for each subblock uniquely identifies the subblock across the plurality of partitions.

12. The system of claim 11, wherein, for each subblock, a portion of the globally unique identifier identifies the partition that stores the subblock.

13. The system of claim 12, wherein the portion of the globally unique identifier that identifies the partition storing the subblock is randomly selected for distributing the load across the plurality of partitions.

14. The system of claim 10, wherein after storing subblocks of the block and metadata for the subblocks in the blocks table, to retrieve the block, the at least one processor is to:
determine a block identifier of the block;
identify an entry in the objects table associated with the block identifier of the block;
determine from the entry, the pointer to entries in the blocks table for the subblocks of the block;
execute a lookup in the blocks table according to the pointer to identify the partitions storing the subblocks for retrieving the subblocks from the identified partitions.

15. The system of claim 10, wherein to determine whether to stripe the block, the at least one processor is to determine whether the block satisfies predetermined criteria.

16. The system of claim 15, wherein the predetermined criteria includes a size of the block.

17. A computer-implemented method of storing at least one block in a distributed storage system, the method comprising:
receiving a write request for a block;
determining whether the block satisfies predetermined criteria;
in response to the block satisfying the predetermined criteria,
striping the block across a plurality of partitions in a pool of partitions,
wherein striping the block across the plurality of partitions comprises:
storing subblocks and metadata for the subblocks in a blocks table associated with the plurality of partitions; and
storing, in an objects table associated with the block, a link to entries in the blocks table for the subblocks; and
in response to the block not satisfying predetermined criteria, storing the block and its metadata in the objects table without striping the block across the plurality of partitions and without storing the block in the blocks table.

18. The computer-implemented method of claim 17, comprising:
retrieving the block after the block is striped, wherein the retrieving includes:
determining a block identifier of the block;
identifying an entry in the objects table associated with the block identifier of the block;
determining from the entry, the link to entries in the blocks table for the subblocks of the block; and
executing a lookup in the blocks table according to the link to identify the partitions storing the subblocks for retrieving the subblocks from the identified partitions.

* * * * *